United States Patent [19]

Shendure

[11] 3,761,117

[45] Sept. 25, 1973

[54] QUICK CONNECT FITTING

[75] Inventor: Ashok S. Shendure, Warrensville Heights, Ohio

[73] Assignee: Crawford Fitting Company, Solon, Ohio

[22] Filed: Apr. 19, 1972

[21] Appl. No.: 245,571

[52] U.S. Cl. .............................. 285/277, 285/316
[51] Int. Cl. ............................................ F16l 37/22
[58] Field of Search ..................... 285/277, 316, 12

[56] References Cited
UNITED STATES PATENTS
2,565,572   8/1951   Pangborn ........................... 285/277

Primary Examiner—Thomas F. Callaghan
Attorney—Albert P. Sharpe, III

[57] ABSTRACT

A quick connect fitting of the type wherein a stem member is telescopically inserted into a body member with locking of the members accomplished by means of balls carried by the body member and adapted to be received in a groove of the stem member. The groove itself is defined by a flat annular bottom wall and diverging end walls. One end wall is defined by a generally frusto-conical surface. The other end wall is defined by a frusto-conical wall portion and a generally concave surface wall portion merging smoothly with the frusto-conical wall portion.

12 Claims, 7 Drawing Figures

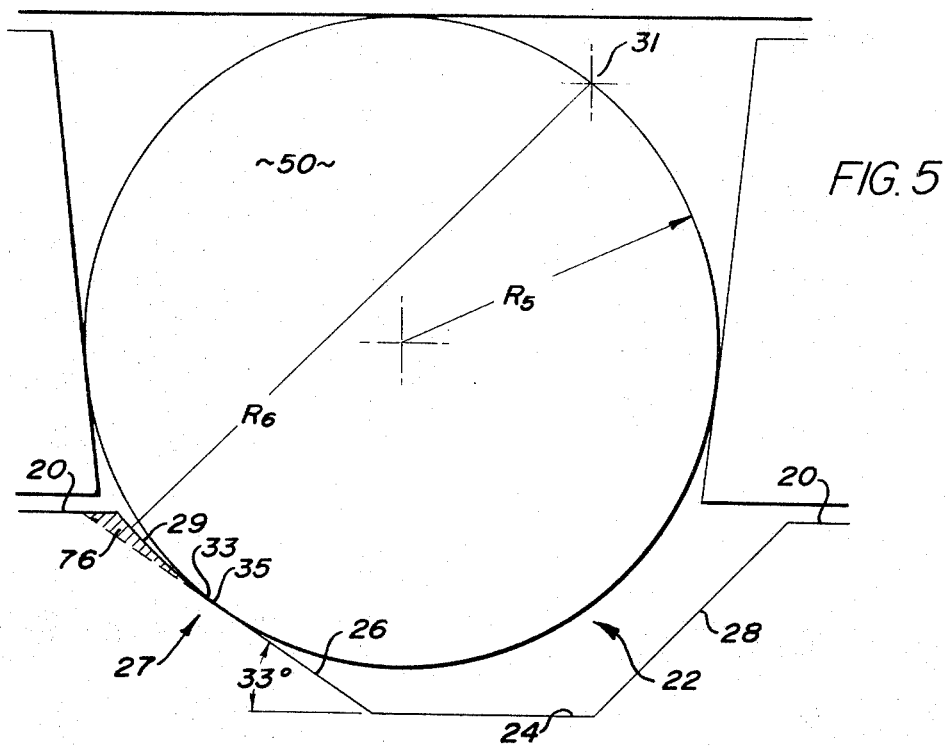
FIG. 5
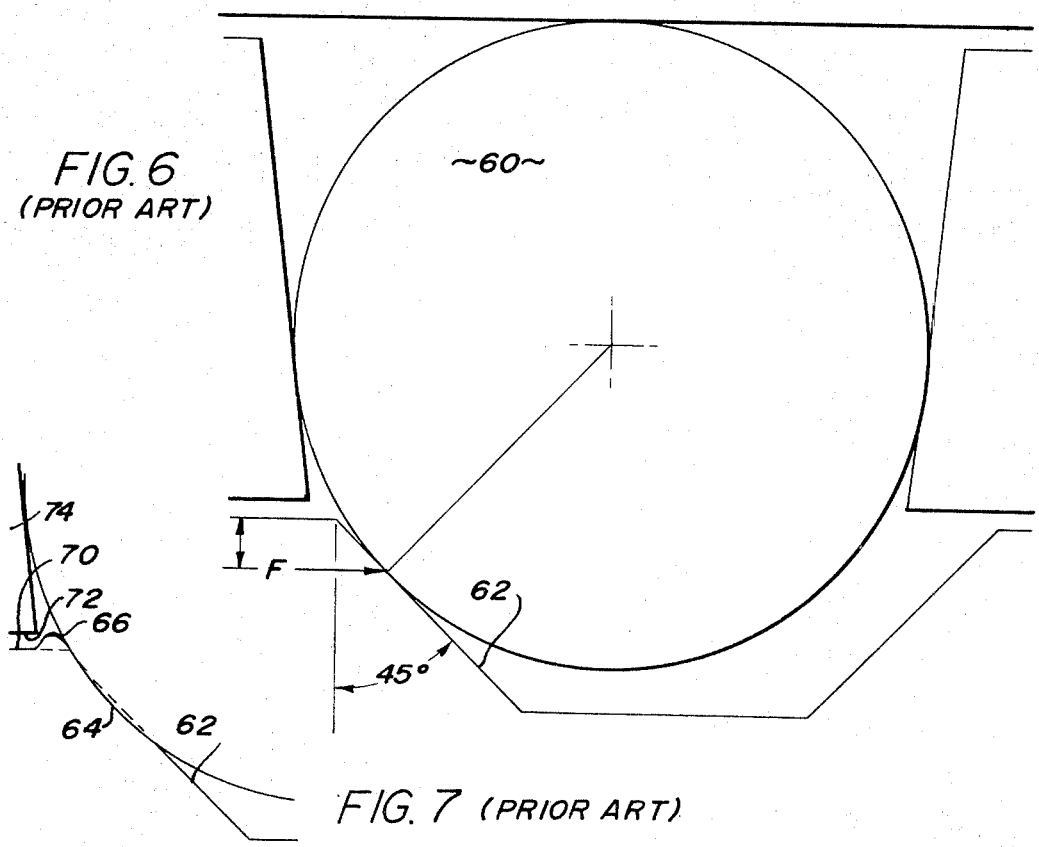
FIG. 6 (PRIOR ART)
FIG. 7 (PRIOR ART)

QUICK CONNECT FITTING

BACKGROUND OF THE INVENTION

Conventional ball detent type quick connect fittings generally include ball members retained in sockets in a body member, a spring biased sleeve member mounted about the body member and a stem member adapted to be telescoped into the body member. The spring biased sleeve member is normally mounted for axial reciprocation selectively to retain the ball members in place in the body member in either a locked or unlocked position with respect to a circumferential groove in the stem member.

The groove itself has taken many different forms in prior art quick connect fittings.

A principal problem encountered in conventional ball detent type quick connect fittings has been the groove end wall which serves as a bearing surface for the ball detent members. This end wall will be designated the forward end wall for purposes of description. The rearward end wall has very little contact with the balls. For this reason the shape of the rearward end wall is not as critical as the shape of the forward end wall for reasons that will become apparent as the discussion proceeds.

In prior art quick connect fittings that have used semicircular shaped end walls several problems have been encountered. Where the radius of the end wall is substantially equal to the radius of the ball members, the ball members tend to stick within the groove when the sleeve is retracted to an unlocked position. Thus the quick disconnect feature of the fitting is defeated as force must be applied to separate the stem member from the body member.

A further problem encountered with a semicircular shaped end wall having a radius substantially equal to the radius of the ball members is that fluid pressure in the fitting will cause the ball members to displace metal immediately adjacent the end wall thus forming a lip or bulge on the stem member itself with the result that separation of the stem member from the body member is rendered difficult.

Where prior art quick connect fittings have utilized a groove design having a generally flat sided trough shape a principal problem has been the excessive cold swaging of both the groove wall and the sleeve due to the fact that the planar surfaces of the groove wall contacting the spherical ball members tend to result in a point contact rather than a desirable line contact. Thus when the fitting is used with high pressure fluid the ball members embed themselves in the groove wall displacing the adjacent metal outwardly to form a jagged lip above the external surface of the stem member. Where the pressure is sufficiently great the lip may bulge to the extent that it binds the body member with the result that unlocking of the fitting is prohibited.

Where excessive cold swaging of the groove wall takes place, the contact area between the wall and the ball member increases markedly. Calculations of the static forces on the ball members show that under such circumstances the radial force component increases to the point where the elastic limit of the sleeve is exceeded resulting in cold flow of the sleeve itself. Clearly this is an undesirable condition because it impairs the quick disconnect feature of the fitting. At the same time cold swaging at the groove wall causes the contact area of the wall and the ball member to move outwardly producing the formation of an undesirable lip about the external surface of the stem member. This lip not only renders more difficult the separation of the stem member from the body member but may even prohibit such separation.

To briefly summarize, where the forward end walls of prior art grooves are defined by substantially flat surfaces, there is excessive cold swaging of the forward end wall and the sleeve by the ball members. Where the forward end wall is curved and is defined on a radius substantially equal to the radius of the ball members, the ball members tend to stick in the groove. Further any cold swaging of the groove wall results in a lip bulging above the adjacent cylindrical surface of the stem member.

Another problem encountered with prior art quick connect fittings is wear on the forward nose portion of the stem member which results from a "dragging" of the ball members over the end of the stem member as it is retracted or inserted. This is undesirable because the forward portion of the stem member in conventional fittings usually defines the sealing surface for an elastomeric seal housed in a recess in the body member. Wear of the forward nose portion of the stem member will tend to cause a condition wherein a defective seal between the members of the fitting could result.

Similarly, the "dragging" of the ball members across the external surface of the stem member can damage an elastomeric seal if the design of the fitting provides for the seal to be carried by the stem member itself.

In studying the problems discussed above an analysis of the mechanical forces acting on the various members of a quick connect fitting is helpful.

Initial contact between a spherical ball and a frusto-conical wall surface is substantially a point contact although there is a slight flattening of the ball under pressure. As pressure increases the frusto-conical wall surface elastically deforms and increases its contact area with the ball until the forces reach an equilibrium. Excessive pressure will cause plastic flow of the frusto-conical wall surface and permanent deformation of such surface.

It was determined that if the initial ball-groove wall contact area was increased by providing a groove with curved end walls permanent deformation would be minimized. However, groove walls with too great a curvature cause the balls to stick in the groove when the sleeve is retracted to an unlocked position. Further analysis lead to the consideration that by making the radius of the end walls of the groove substantially larger than the radius of the balls, the propensity of the balls to stick in the groove would be reduced. As the radius of the end walls of the groove gets excessively large, however, the groove wall approaches a planar surface with the resulting problems noted above.

A desired result is achieved when there is a balancing between two mutually exclusive designs for the end walls of the groove. A decreased radius in curvature of the end wall minimizes plastic deformation of the wall. An increased radius, however, minimizes the tendency of the balls to stick in the groove. The preferred concept is a combination of the two principles providing for a forward end wall having a portion defined by a frusto-conical wall portion and another portion defined by a generally concave surface wall portion substantially larger in radius than the ball radius with the frusto-conical wall portion substantially tangent to the concave surface wall portion. The preferred concept is, in short, a composite end wall.

The composite end wall has been found to overcome the two principal disadvantages discussed above, i.e., the sticking of the balls in the groove and excessive plastic deformation of the groove wall caused by the balls under pressure.

A further advantage of the composite end wall comes about when the initial contact area of the ball with the end wall is slightly below the point where the frusto-conical wall portion of the end wall merges with the concave surface wall portion of the end wall.

As compared to an end wall that is completely concave, the composite end wall decreases the contact area of the end wall and the ball. This decreased contact area lessens the radial forces transmitted to the sleeve member through the ball and thus minimizes deformation of the interior wall of the sleeve member.

Deformation of the interior wall of the sleeve by the ball is caused by two forces which act on the ball in a radial direction forcing it into the sleeve internal wall. These forces are imparted to the ball by the contacting wall of the groove in the stem member and the ball socket wall of the body member. The radial force imparted by the groove wall and the socket wall is inversely proportional to the tangent of the acute angle between the contact surface and the axis of the stem and body members. In each case a 90° wall surface will totally eliminate the radial force. However, at the same time, such a wall surface would render impossible disconnecting the fitting because there would be no force to move the ball out of the groove when the locking sleeve is retracted. Once again there is a need for a balancing of design considerations which in some cases are mutually exclusive.

Another consideration in the design of ball detent fittings is the interchangeability of parts. With small diameter fittings it is difficult to maintain effective tolerances between the internal diameter of the locking sleeve and the diameter of the bottom wall of the groove. Thus, it is considered desirable to provide for a socket design in the body member that will prevent the balls from bottomming in the groove of the stem member. If the sockets were designed to allow the ball to bottom in the groove, a slightly undersized sleeve and a slightly oversized stem member may not mate properly. Thus it was considered desirable to provide a design in which the balls would not contact the bottom wall of the groove of the stem member.

It was determined experimentally that the forward end wall of the groove of the stem member could not be totally concave because of the problem of the balls sticking in the groove when it is desired to disconnect the stem member from the body member. Thus, a frusto-conical surface diverging from the bottom wall of the groove was designed which merges tangentially with a concave surface. In order to minimize sticking of the balls in the groove it is desirable to define a frusto-conical surface by the largest angle possible. At the same time the angle selected must be such that the effect of the concave surface is not minimized such that excessive deformation occurs. It was determined that a frusto-conical wall defining an angle of about 33° to the axis of the stem member performed the necessary function. Further it was found that the point of merger of the frusto-conical wall and the concave surface wall should be below the midpoint of the groove. With the wall angle at substantially less than 33° the resulting radial force on the balls is excessive at high pressure and deformation of the sleeve and the end wall occurs to an unacceptable extent. Where the angle is substantially greater than 33° the balls tend to stick in the groove because of the resulting extended length of the concave surface. Additionally the frusto-conical surface cannot be extended tangentially of the concave surface without decreasing the effective contact area of the concave surface. Where the point of merger is not tangential a sharp edge is formed which is undesirable.

The forward cylindrical surface of the stem member is reduced in diameter to eliminate wear resulting when the balls drag over such surface during the connecting or disconnecting of the fitting. Since the balls cannot bottom in the groove, the forward cylindrical surface of the stem member is reduced to about the same diameter as the bottom wall of the groove. Thus, most of the undesirable dragging and wear is eliminated.

BRIEF DESCRIPTION OF THE INVENTION

Briefly described, the invention comprises a quick connect fitting of the type wherein a stem member is telescopically received in a body member with locking of the members accomplished by means of balls carried by the body member and adapted to be received in a groove of the stem member. The groove itself is defined by a flat annular bottom wall and diverging end walls. The rearward end wall is defined by a generally frusto-conical surface. The forward end wall is of a composite design comprising a fursto-conical wall portion and a concave surface wall portion merging smoothly with the frusto-conical wall portion. The composite forward end wall serves to minimize sticking of the ball in the groove. In addition, the composite end wall design reduces deformation of both the end wall and the sleeve brought about by high pressure in the fitting.

DESCRIPTION OF THE DRAWINGS

A more complete description of the invention will now be made with reference to the accompanying drawings in which:

FIG. 5 is a schematic view of the ball-groove structural relationship of this invention;

FIG. 6 is a schematic view of the ball-groove structural relationship of a prior art fitting; and FIG. 7 is a schematic view of a prior art fitting after deformation of the groove end wall has taken place due to pressurization of the fitting.

DESCRIPTION OF THE PREFERRED EMBODIMENT

Figure 1:
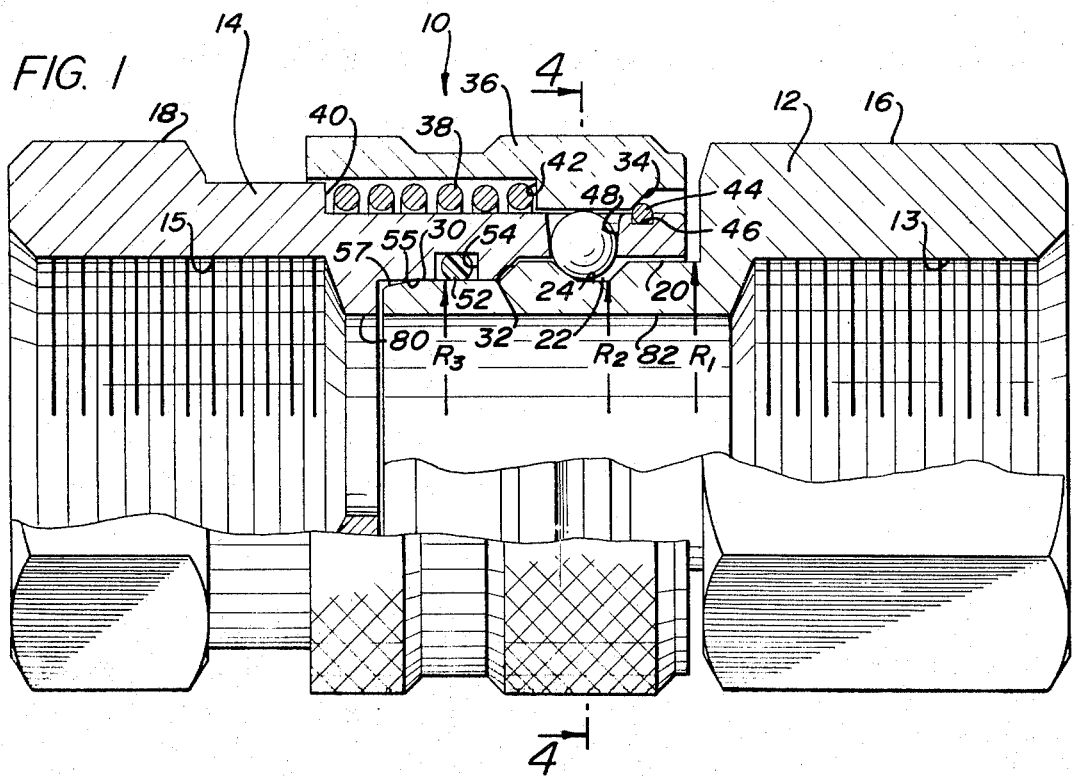
FIG. 1 is an elevational view partly in section of the quick connect fitting of this invention in a locked position.

A description of the preferred embodiment of the invention will now be made with reference to FIG. 1 in which there is shown a quick connect fitting 10 including a stem member 12 telescopically received within a body member 14. The outer end of both the stem and the body are internally threaded with pipe threads 13, 15 in order to provide end connections for joining the fitting to pipes. Alternate end connections such as ferrule type fittings, weld fittings or the like should be considered within the spirit of this invention as any connecting means well known to those skilled in the art may be employed.

In order to facilitate connecting the fitting into a fluid system tool pads 16 and 18 are shown on the stem and body members respectively.

The stem member 12 includes a first cylindrical surface 20 which is substantially concentric with the axis of the stem. A groove 22 is defined in the first cylindrical surface 20. As shown in FIG. 5, the groove includes a generally flat bottom wall 24 bounded by end walls 27, 28. For purposes of description the end wall 27 will be designated the forward end wall whereas the end wall 28 will be designated the rearward end wall.

Attention will now be directed to the forward end wall 27 which is comprised of a frusto-conical wall portion 26 and a concave surface wall portion 29 which extends from the frusto-conical wall portion 26 to the first cylindrical surface 20. It will be noted from FIG. 5 that the frusto-conical wall portion 26 merges tangentially with the concave surface wall portion 29 and defines an angle of about 33° with the axis of the stem member.

The concave surface wall portion 29 is defined on a radius $R_6$ drawn from a point of origin 31. As will be obvious from FIG. 5, the radius $R_6$ is relatively large and substantially exceeds the radius $R_5$ of the ball member 50.

For purposes of illustration the rearward end wall 28 is shown as a frusto-conical surface diverging from the bottom wall 24 at an angle of approximately 45° to the axis of the stem member. End wall 28 extends from the bottom wall 24 to the first cylindrical surface 20. Since the ball 50 is not in contact with the end wall 28, the shape of end wall 28 is not as critical as is the shape of end wall 27 which, as will be obvious in FIG. 5, is a wall of contact of the stem member with the ball 50.

The point of merger 33 of the frusto-conical wall portion 26 with the concave surface wall portion 29 is approximately half way between the bottom wall 24 and the first cylindrical surface 20. In the preferred embodiment the point of merger 33 is actually slightly closer to the bottom wall 24 than the first cylindrical surface 20 although for purposes of description it is sufficient to describe the point of merger as positioned approximately half way betwen the bottom wall 24 and the first cylindrical surface 20.

Turning once again to FIG. 1, the forward portion of the stem 12 includes a second cylindrical surface 30 coaxial with the axis of the stem member. The second cylindrical surface 30 is defined on a slightly smaller radius $R_3$ than the radius $R_1$ of the first cylindrical surface 20. A sloping shoulder 32 bridges the two cylindrical surfaces 20, 30.

A recess 54 is defined in the internal cylindrical surface 55 of the body member 14 for the purpose of receiving an elastomeric O-ring 52. O-ring 52 projects from the recess 54 enabling it to seal against the second cylindrical surface 30 of the stem member as the stem member is inserted into the body member. A slight taper 57 is imparted to the forward end of the stem member in order to facilitate entry of the stem into the body. The extended length of the second cylindrical surface 30 permits a certain degree of axial movement between the stem and the body without loss of sealing between these members.

Body member 14 supports a sleeve 36 which is axially reciprocable between locked and unlocked positions. The locked position of the sleeve is shown in FIGS. 1 and 2 whereas the unlocked position is shown in FIG. 3.

Figure 2:
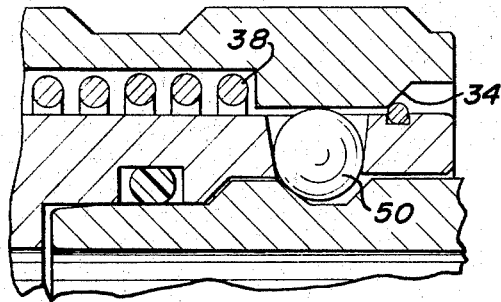
FIG. 2 is an enlarged fragmentary sectional view of the fitting of FIG. 1 and showing the locked position of the balls and sleeve.
Figure 3:
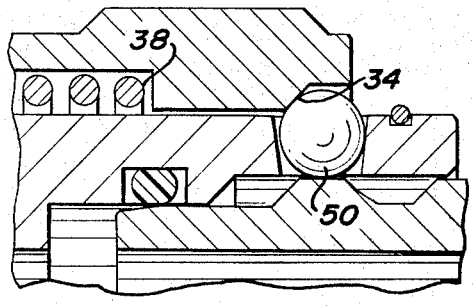
FIG. 3 is an enlarged fragmentary sectional view of the fitting of FIG. 1 and showing the retracted or unlocked position of the balls and sleeve.

An inwardly extending camming surface 34 serves to bias balls 50 inwardly as the sleeve is moved from the position of FIG. 3 to that of FIG. 1 by means of spring 38. One end of spring 38 engages shoulder 40 on the body member while the other end of the spring engages shoulder 42 on the sleeve. Axial movement of the sleeve in one direction is limited by a snap ring 44 partially received in a groove 46 at one end of the body member.

Ball receiving sockets 48 are defined within the body 14. These sockets are defined by outwardly diverging frusto-conical surfaces that serve to capture the balls 50 and retain such balls within the body while permitting a portion of the ball to extend into groove 22 of stem 12 when the stem and body are in a coupled relationship. In the preferred embodiment the socket walls intersect the axis of the body member at an angle of approximately 83°. Thus the socket walls are defined on an included angle of approximately 14°. It has been found that where the included angle is more acute there will be a tendency of the balls to stick in the sockets.

The dimensional relationship of each ball to its respective socket is such that when the ball is in the locked position as shown in FIG. 1 it does not contact the bottom wall 24 of groove 22. Rather, contact of the ball with the stem is limited to contact with the forward end wall 27 as is shown more clearly in FIG. 5.

Certain dimensional relationships between the various elements of the fitting will now be described.

Referring initially to FIG. 1, it has been noted that the first cylindrical surface 20 of stem 12 is defined on a radius $R_1$ extending from the axis of stem 12. The bottom wall 24 of groove 22 is defined on a radius $R_2$. The second cylindrical surface 30 is defined on a radius $R_3$.

It is desirable that the radius $R_2$ defining the bottom wall of the groove be approximately the same as the radius $R_3$ defining the second cylindrical surface 30. In fact it is preferred that these radii be substantially the same. Since the relationship of ball 50 to socket 48 is such that the ball will not bottom in groove 22, by maintaining radii $R_2$ and $R_3$ at approximately the same length the balls will not drag over the second cylindrical surface 30 during either assembly or disassembly of the fitting.

Clearly the radius $R_3$ defining the second cylindrical surface 30 is necessarily less than the radius $R_1$ defining the first cylindrical surface 20.

Figure 4:
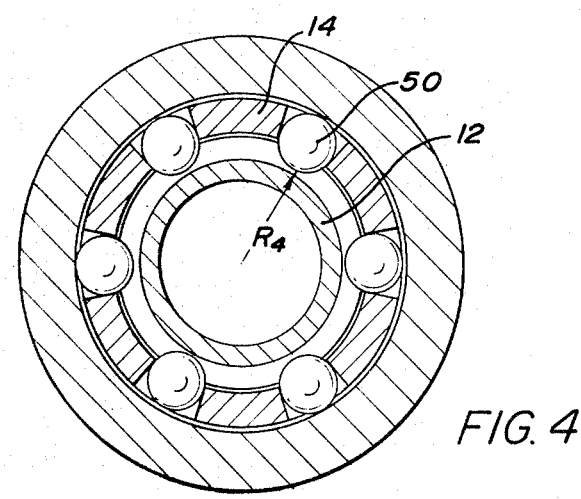
FIG. 4 is a sectional view taken along the line 4—4 of FIG. 1.

Turning now to FIG. 4, the radius $R_4$ is the radius of the circle drawn tangent to each of the balls 50 when they are received within groove 22 as the fitting is made up. In order to insure that the balls do not bottom in the groove while at the same time insure that the balls clear the second cylindrical surface 30 during make up, the radius $R_4$ should be greater than either of the radii $R_2$ or $R_3$. The radius $R_4$ is controlled by the relationship of the radius of the ball ($R_5$) to the size of the socket 48 as determined by the frusto-conical walls of such socket.

The curved surface wall portion 29 of FIG. 5 is particularly structured so that the radius $R_6$ defining such surface is of a length that is substantially greater than the radius $R_5$ of the ball. The precise length of the radius $R_6$ will vary with the size of the fitting, the materials used, and other considerations applicable to the total design of the fitting. The schematic drawing of FIG. 5 shows the relationship of $R_6$ being approximately equal to twice $R_5$ ($R_6$ equals $2R_5$). This example is merely illustrative in order to show the approximate proportional relationship between the ball and the concave surface wall portion and should not be considered as limiting to this invention. The value of $R_6$ is selected to provide a substantially large difference between the length of the radius $R_5$ and the radius $R_6$.

Theoretically, when two curved surfaces contact one another there is a point contact in section. However, where one curved surface has a radius substantially larger than the other curved surface there is actually established a line contact in section since theoretical conditions are not attainable in manufactured parts. In three dimensional relationship the contact zone is actually area contact taking the form of a narrow band throughout the circumference of the surfaces.

Line contact between the mating surfaces in section is considered more desirable than point contact for the reason that permanent deformation of the groove wall is lessened as has previously been discussed.

The relationship of the ball to the walls defining socket 48 and the concave surface wall portion 29 of the groove 22 is such that when in the locked position as shown in FIG. 5 the ball will make contact with the forward end wall 27 at an area 35 slightly below the point of merger 33 of the concave surface wall portion 29 with the frusto-conical wall portion 26.

Before describing the operation of the fitting of this invention a brief reference will be made to problems of prior art fittings operating under relatively high pressure.

FIGS. 6 and 7 illustrate the problem of groove wall deformation encountered with prior art couplings. The groove wall as shown in FIG. 6 is defined at an angle of approximately 45° to the axis of the fitting. There is thus essentially point contact between the ball 60 and the frusto-conical surface 62 of the stem member. As pressure in the fitting increases the ball flattens slightly and the surface 62 elastically deforms. The net result is an increase in the contact area of the ball and the frusto-conical surface. When the pressure becomes sufficiently great the ball will press into the frusto-conical surface to the extent that plastic flow results until the contact area becomes great enough to equalize the force of the ball. The result is a dimple 64 (FIG. 7) in the surface 62 bounded by a raised ridge or lip 66 which extends above the cylindrical surface 70.

As is shown in FIG. 7 the lip 66 may become so pronounced that it binds or interferes with the internal surface 72 of the body 74. The net result is that uncoupling of the fitting may be impaired as it may be impossible to retract the stem from the body due to the presence of the lips 66 formed by each of the balls.

Turning now to FIG. 5, the operation of the coupling of this invention will be contrasted to that described with respect to the prior art. As shown in FIG. 5, the contact area between the forward end wall 27 and the ball 50 will increase faster and with much less plastic flow than that just described with reference to FIGS. 6 and 7. Whereas the prior art coupling of FIG. 7 tends to build up a lip in order to increase the contact area, such "build up" area is designed into the coupling of FIG. 5 as is illustrated by the shaded area 76. Thus the formation of undesirable lips brought about by excessive wall deformation is largely eliminated by the coupling of this invention.

It is desirable for the length of the frusto-conical wall portion 26 to be relatively short while yet providing sufficient length to preclude sticking of the balls in the groove. In the preferred embodiment as shown in FIG. 5 the frusto-conical wall portion 26 terminates at about the area of contact 35 of the ball with the concave surface wall portion 29.

It will be observed from FIG. 1 that the fitting of this invention has "full flow" characteristics in that the internal walls 80, 82 of the body and stem members respectively are defined on substantially the same radius. Thus, a flow of fluid from a pipe interconnected into either the body or stem members will not be restricted throughout the length of the coupling member. Stated in other terms the walls 80, 82 are approximately the same diameter as the internal diameter of the pipe adapted to be connected to the end connection of the coupling.

As an example of the technical data associated with the coupling of this invention a pressure rating of vacuum to 3,000 psi max. may be expected where the coupling stem and body are fabricated from brass. This rating increases to 6,000 psi max. where the stem and body members are fabricated from type 316 stainless steel. The coupling has a temperature rating of 250°F with a Buna "N" 0-ring and 450°F with a Viton "A" 0-ring.

Several advantages are inherent in the coupling of this invention and should be enumerated.

The quick connect coupling of this invention is designed for maximum flow and fast, leak tight connections with rigid or flexible tubing and piping lines. The coupling may be used in hydraulic and pneumatic systems, gravity flow systems and transfer line connections. The coupling operates in vacuum or pressurized systems at high or low temperatures, and in gas and liquid service, as determined by the chemical resistance and properties of the metal and the 0-ring used. Due to the design characteristics of the coupling there is full flow through the coupling with no orifice restrictions. The interconnection between the stem and body members provides for 360° swivel action. No twisting is required for connecting or disconnecting the coupling. The 0-rings can be changed without disassembling the entire body. Furthermore, standard 0-rings of various materials can be used. Various end connections are available depending upon the preference of the user. The coupling may be assembled in seconds by sliding the spring loaded sleeve to a retracted position, inserting the stem into the body until it bottoms and thereafter releasing the sleeve. Disassembly is accomplished by simply pulling back the spring biased sleeve and removing the stem from the body.

For ease of description the principles of the invention have been set forth in connection with but a single illustrate embodiment. It is not intended that the illustrated embodiment nor the terminology employed in describing it be limiting in as much as variations may be made by one having ordinary skill in the art without departing from the scope and spirit of the invention, rather it is intended that any restriction of the invention be limited to the spirit and scope of the appended claims.

What is claimed is:

1. A quick connect fitting comprising in combination:
   a body;
   a stem adapted to be received within said body, said stem having an axis and a first external cylindrical surface;
   an annular groove in said first cylindrical surface defined by a bottom wall and first and second diverging end walls;
   said first end wall defined by a generally frusto-conical surface;
   said second end wall defined by a circumferentially continuous generally frusto-conical wall portion and a circumferentially continuous concave surface wall portion extending from said frusto-conical wall portion to said first cylindrical surface;
   a sleeve disposed about said body;
   retaining sockets in said body;
   ball members disposed in said retaining sockets and positioned to engage said second end wall when said stem is inserted into said body;
   the radius of said concave surface wall portion being greater than the radius of said ball members;
   the location of intersection of said ball members and said second end wall being about the intersection of said concave surface wall portion and said frusto-conical wall portion;
   means to retain said ball members in said retaining sockets when said stem is removed from said body;
   said sleeve being adapted to retain said ball members in a locking position in contact with said stem.

2. The invention of claim 1 wherein:
   said first cylindrical surface of said stem is defined by a first radius originating from said axis;
   said bottom wall of said groove is defined by a second radius originating from said axis;
   a forward portion defined on said stem and including a second cylindrical surface defined by a third radius originating from said axis;
   said third radius being less than said first radius.

3. The invention of claim 2 wherein said second radius is not substantially less than said third radius.

4. The invention of claim 2 wherein sealing means is retained in a recess in said body and sealingly engages said second cylindrical surface.

5. The invention of claim 1 wherein the retaining sockets of said body are defined by inwardly converging generally frusto-conical surfaces so dimensioned as to prevent the ball members from contacting said bottom wall of said annular groove.

6. The invention of claim 1 in which said frusto-conical wall portion merges substantially tangentially with said concave surface wall portion.

7. A quick connect fitting including a stem member telescopingly inserted into a body member, sealing means between said members, ball members projecting from retaining sockets in said body member into an annular groove in the stem member, and sleeve means mounted about said body member for locking said balls in said groove, the improvement in said groove comprising:
   a generally flat bottom wall;
   a rearward end wall;
   a forward end wall adapted to be contacted by said ball members, said forward end wall defined by a circumferentially continuous generally frusto-conical wall portion extending from said bottom wall and a circumferentially continuous concave surface wall portion extending from said frusto-conical wall portion;
   said frusto-conical wall portion merging substantially tangentially with said concave surface wall portion;
   the relationship of said forward end wall to said ball members being such that in a locked position of the quick connect fitting the ball members contact said forward end wall at a location at about the intersection of said frusto-conical wall portion and said concave surface wall portion.

8. The invention of claim 7 wherein the radius of said concave surface is substantially greater than the radius of the ball members.

9. The invention of claim 8 wherein the radius of said curved surface is about twice the radius of the ball members.

10. The invention of claim 7 wherein said frusto-conical wall portion defines an angle of about 33° with respect to the axis of said stem member.

11. The invention of claim 7 wherein the relationship of said forward end wall to the ball members is such that with the fitting in a locked position the ball members contact said frusto-conical wall portion at a location slightly below the point of merger of said frusto-conical wall portion and said concave surface wall portion.

12. The invention of claim 11 wherein the contact between said ball members and said frusto-conical wall is essentially line contact in section.

* * * * *